(12) United States Patent
Spencer et al.

(10) Patent No.: US 11,411,772 B1
(45) Date of Patent: Aug. 9, 2022

(54) ESTABLISHING TUNNELING CONNECTION OVER RESTRICTIVE NETWORKS

(71) Applicant: BlackBerry Limited, Waterloo (CA)

(72) Inventors: Bradford Lawrence Spencer, Hammonds Plains (CA); Liam Hennebury, Bedford (CA); Yu Tang, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/232,014

(22) Filed: Apr. 15, 2021

(51) Int. Cl.
*H04L 12/46* (2006.01)
*H04L 69/16* (2022.01)
*H04L 67/141* (2022.01)

(52) U.S. Cl.
CPC ........ *H04L 12/4633* (2013.01); *H04L 67/141* (2013.01); *H04L 69/16* (2013.01)

(58) Field of Classification Search
None
See application file for complete search history.

(56) References Cited

U.S. PATENT DOCUMENTS

| | | | |
|---|---|---|---|
| 9,455,950 B1* | 9/2016 | Li | H04L 12/4633 |
| 2003/0188001 A1* | 10/2003 | Eisenberg | H04L 69/164 |
| | | | 709/229 |
| 2006/0031928 A1* | 2/2006 | Conley | H04L 63/0236 |
| | | | 726/11 |
| 2006/0168321 A1* | 7/2006 | Eisenberg | H04L 63/0209 |
| | | | 709/238 |
| 2006/0235939 A1* | 10/2006 | Yim | H04L 63/029 |
| | | | 709/217 |
| 2012/0304277 A1* | 11/2012 | Li | H04L 63/20 |
| | | | 726/12 |
| 2013/0114432 A1* | 5/2013 | Haynes | H04L 67/141 |
| | | | 370/252 |
| 2013/0170502 A1* | 7/2013 | Chen | H04L 63/0272 |
| | | | 370/401 |
| 2015/0293756 A1* | 10/2015 | Wright | G06F 21/577 |
| | | | 717/178 |
| 2017/0105142 A1* | 4/2017 | Hecht | H04L 67/02 |
| 2018/0337802 A1* | 11/2018 | Parameswaran | H04L 12/4633 |
| 2020/0053163 A1* | 2/2020 | Ngo | H04L 63/166 |
| 2021/0021564 A1* | 1/2021 | Chand | H04L 63/20 |
| 2021/0152529 A1* | 5/2021 | Ruppin | H04L 63/107 |

* cited by examiner

*Primary Examiner* — Jonathan A Bui

(74) *Attorney, Agent, or Firm* — Fish & Richardson P.C.

(57) ABSTRACT

Systems, methods, and software can be used for establishing a tunneling connection over restrictive networks. One example of a method includes selecting, at an endpoint, at least one protocol to be used to establish a tunneling connection between the endpoint and a server. The at least one protocol is one of transmission control protocol (TCP) or user datagram protocol (UDP). The method further includes transmitting data between the endpoint and the server over the tunneling connection by using the selected at least one protocol.

20 Claims, 4 Drawing Sheets

ESTABLISHING TUNNELING CONNECTION OVER RESTRICTIVE NETWORKS

TECHNICAL FIELD

The present disclosure relates to a method for establishing a tunneling connection over restrictive networks.

BACKGROUND

Different protocols can be used to establish a connection between a server and an endpoint, including, for example, transmission control protocol (TCP) and user datagram protocol (UDP). TCP and UDP can be used in different use cases based on the needs.

DESCRIPTION OF DRAWINGS

Like reference numbers and designations in the various drawings indicate like elements.

DETAILED DESCRIPTION

Selecting a protocol to establish a tunneling connection is critical to different use cases. In general, UDP is a light-weight protocol. For example, UDP does not have automatic retransmissions and has minimal overhead. As such, it provides better user experience when used for certain applications, e.g., video conference. However, in some cases, an endpoint may not be able to successfully establish a tunneling connection to a server based on UDP. In one example, the endpoint may be in the coverage of a local network. The local network may not permit a UDP-based tunneling connection to reach to another server on the Internet.

The present application provides a method of selecting/determining a protocol to be used to establish a tunneling connection. The protocol selection can be determined by at least one of (1) selecting UDP first and then selecting TCP when the UDP connection is not completed; (2) selecting UDP and TCP simultaneously first and then selecting UDP when the UDP connection is working; and (3) selecting UDP when at least one parameter of the tunneling connection associates with UDP. The protocol selection techniques will be described in greater detail below, with reference to FIGS. 1 to 4.

Figure 1:
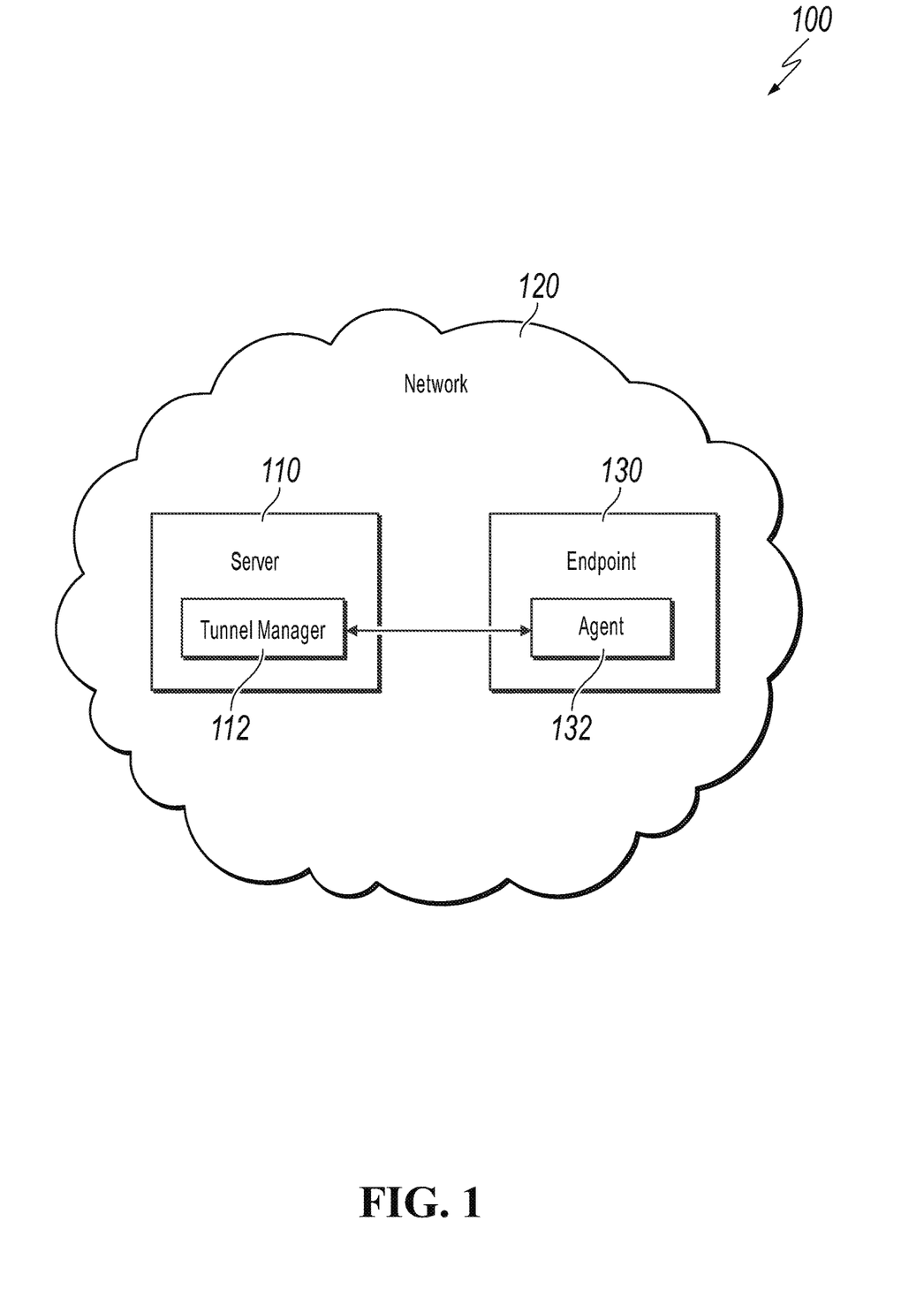
FIG. 1 is a diagram showing an example system for selecting a protocol to be used to establish a tunneling connection, according to an implementation.

FIG. 1 is an example system 100 for selecting a protocol to be used to establish a tunneling connection, according to an implementation. At a high level, the example system 100 includes one or more servers 110, a network 120, and one or more endpoints 130 over the network 120. In general, the system 100 can be implemented to select a protocol to be used to establish the tunneling connection between the server 110 and the endpoint 130. In one example, the endpoint 130 comprises an agent 132 configured to determine and establish a tunneling connection using at least one of UDP or TCP with the server 110 over the network 120. The agent 132 may be a software, an application, an extension, or a component of the operating system which is configured to manage a connection with the server 110. The server 110 comprises a tunnel manager 112 configured to receive a request of establishing a tunneling connection from the endpoint 130. The tunnel manager 112 may be a software, an application, an extension, or a component of the operating system which is configured to manage a connection with the endpoint 130. In one example, the tunnel manager 112 may be configured to encapsulate/decapsulate, encrypt/decrypt, and authenticate/sign packets as they flow into and/or out of the tunnel. In one example, the server 110 may further comprise an agent to process the packets if needed.

In one example, the system 100 provides an approach that allows the TCP traffic to be concentrated to TCP load-balanced servers while the endpoint 130 uses networks which can send UDP without restriction to connect directly to UDP ports on the server 110. In this case, a TCP connection can be used as a backup for transmission when the UDP connection fails and keeps maximum network performance and minimal cloud cost for UDP.

In one example, the endpoint 130 selects UDP and determines whether the UDP connection is completed before two handshakes are completed, and tries to establish a TCP connection when the two handshakes fail. A number of handshakes can be more than two times based on the needs. For example, the endpoint 130 starts a handshake using UDP and waits for a predetermined time, e.g., 11 seconds. If the endpoint 120 does not finish the handshake, and the status of tunnel is declared as "Retrying." Likewise, if the endpoint 130 have a working tunnel and then the working tunnel stops working, the endpoint 130 initiates one or more attempt to reestablish the tunnel but fails, and then the status of tunnel is declared as "Retrying." In some cases, if the TCP connection fails to connect, the endpoint 130 reacquires address information again in case the server 110 has failed.

In one example, the endpoint 130 selects UDP and TCP simultaneously or at least overlapped with each other to establish a connection. In some cases, if UDP works, the endpoint 130 keeps the UDP connection. In some cases, if, after a short fixed delay, e.g. a predetermined duration, only TCP works, the endpoint 130 keeps the TCP connection. In some cases, if, after a slightly longer delay, neither UDP nor TCP works, the endpoint 130 reacquires address information to reestablish the connection.

In one example, the endpoint 130 determines at least one parameter of the tunneling connection associated with UDP and selects UDP to be used in the tunneling connection. For example, if the endpoint 130 can retrieve the SSID of Wi-Fi networks and other local parameters to determine that a UDP connection has been successful, the endpoint 130 selects UDP to establish a tunneling connection.

In one example, the system 100 can allow administrators or users to configure the endpoint 130 to always use TCP. In one example, the system 100 allows the users to force TCP on the endpoint 130.

With the bearer channel separated from the codec, the system 100 allows bearer IP/port address of the endpoint 130 to be changed and allows the bearer between UDP and TCP to be switched seamlessly without an observable interruption in the tunnel's operation.

For efficient data transmission, the endpoint 130 determines a maximum transmission unit (MTU) size and transmits a completed message on the TCP socket which means that no message gets fragmented into two TCP segments. By tuning network interface MTU of the endpoint 130 based on maximum segment size (MSS) of the TCP bearer socket, the endpoint 130 determines a MTU size based on the connection and generates an IP packet based on the MTU size to ensure an efficient data transmission which leads to an optimal battery use, radio use, and the like in mobile devices and maximum throughput. In some cases, the endpoint 130 relies primarily on TCP MSS negotiation to prevent oversized messages from the endpoint 130 to the server 110.

By the protocol selection techniques disclosed herein, the system 100 is able to achieve TCP performance on par with UDP performance.

Turning to a general description, an endpoint, e.g., the endpoint 130, may include, without limitation, any of the following: computing device, mobile electronic device, user device, mobile station, subscriber station, portable electronic device, mobile communications device, wireless modem, wireless terminal, server, web server, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Network 120 includes any suitable networks operable to support communication between components of system 100. Network 120 may include any type of wired or wireless communication channel capable of coupling together computing nodes. Network 120 may include any interconnecting system capable of transmitting audio, video, electrical signals, optical signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 120 may be configured to support any communication protocols as would be appreciated by one of ordinary skill in the art upon viewing this disclosure.

Servers 110 include any suitable storage scheme including any software, hardware, firmware, and/or combination thereof capable of storing and processing information. Example servers 110 include individual data storage devices (e.g., memory, disks, solid-state drives), which may be part of individual storage engines and/or may be separate entities coupled to storage engines. Servers 110 may store third-party databases, database management systems, a file system, and/or other entities that include or that manage data repositories.

Figure 2:
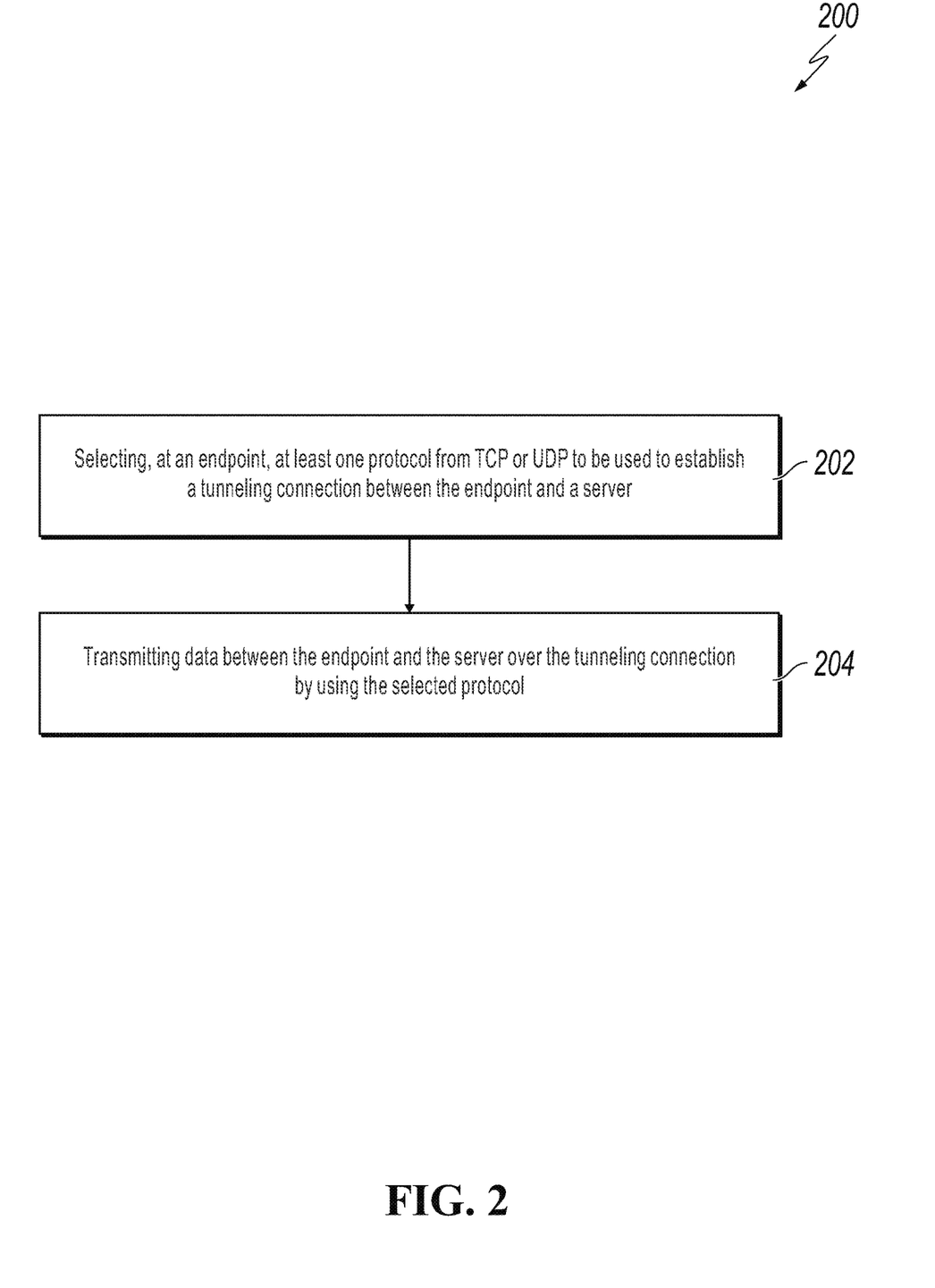
FIG. 2 is a flowchart showing an example method for selecting a protocol to be used to establish a tunneling connection, according to an implementation.

FIG. 2 is a flowchart showing an example method 200 for selecting a protocol for establishing a tunneling connection, according to an implementation. The method 200 can be implemented by a system, e.g., the system 100 shown in FIG. 1, for selecting a protocol. The example method 200 shown in FIG. 2 can be implemented using additional, fewer, or different operations, which can be performed in the order shown or in a different order.

The method 200 provides techniques for selecting a protocol to be used to establish a tunneling connection. In certain use cases, UDP is required to be used to establish a connection between a server and an endpoint for, e.g., a faster transmission speed or a lower overhead. In order to solve the network limitations using UDP, the method 200 provides a flexible protocol determination to establish a secure and efficient connection.

The method 200 starts at step 202 with selecting, at an endpoint, at least one protocol to be used to establish a tunneling connection between the endpoint and a server. In some cases, the protocol is one of TCP or UDP.

In some cases, in selecting the protocol to be used to establish the tunneling connection, the endpoint sends at least one request to the server via UDP and selects TCP to be used in the tunneling connection in response to a failure of receiving a response corresponding to the at least one request. For example, a failure to successfully establish a functional tunnel over UDP may comprise at least one scenario of no responses at all or only a few responses and then no more responses. Furthermore, some firewalls allow a short burst of UDP, e.g., a temporary bidirectional UDP, but then block any more packets after a few seconds or a few packets. In this case, domain name system (DNS)-like request bursts are allowed, but not streams. In other cases, this burst of UDP may be caused by a deep inspection of packets which takes time before access control is applied to block.

In some cases of sending the request to the server via UDP, the endpoint sends a first request to the server, and the first request is to establish the tunneling connection. In some cases, the first request comprises at least one authentication credential. The first request carries authentication credentials, e.g., tokens, other proof of identity. In response to the authentication credentials, the endpoint may set up a particular tunneling connection based on the authentication credentials. In some cases, the endpoint sends a public key which may be used in the first request. Furthermore, the endpoint may, in response to the first request, receive a first response from the server to establish the tunneling connection. In some cases, the first response carries authentication credentials for the endpoint and parameters which the endpoint needs to set up the tunneling connection. In some cases, an authentication for the endpoint can be done by examining a token included in the first request. In some cases, the first response may comprise a public key for the endpoint, an internet protocol (IP) address and port for the endpoint and the server to connect to for the tunneling connection via UDP or TCP, and IP networking parameters for the endpoint to use based on the needs. The IP networking parameter may comprise assigned IP addresses, network prefixes, routes, DNS servers, DNS search suffixes, split tunnel ranges, maximum MTU, and the like. Furthermore, the endpoint sends a second request to the server via UDP and selects TCP to be used in the tunneling connection in response to a failure of receiving a second response corresponding to the second request from the server. In some cases, the second request may be tunnel-specific. For example, the second request may be a handshake request message, which includes one or more cryptography outputs to prove that the endpoint has possession of a private key that pairs with the public key provided in the first request, and other values needed to establish the session.

In some cases, in selecting the protocol to be used to establish the tunneling connection, the endpoint uses TCP and UDP in the tunneling connection, determines that UDP transmits a packet to the server successfully, and selects UDP to be used in the tunneling connection.

In some cases, in selecting the protocol to be used to establish the tunneling connection, the endpoint determines that at least one parameter of the tunneling connection associates with UDP and selects UDP to be used in the tunneling connection. In some cases, selecting UDP may be a pre-configuration option.

In some cases, the endpoint further determines a MTU size based on the selected at least one protocol, and generates an IP packet based on the MTU size. In some cases, the endpoint may keep track of an actual/real-time transmission of the tunneling connection and adaptively change the MTU size accordingly. In some cases, the MTU size may be determined by a maximum number of bytes that the bearer network can carry in a single bearer packet, including the whole IP packet header. In some cases, there are two MTUs:

(1) The MTU of the bearer network indicates how big its packets can be. Its IP packets must contain an IP header which addresses to a server's IP address, a TCP or UDP header which addresses to a server port, and a tunnel header. In some cases, the tunneled IP packets may be encrypted; and (2) The MTU of the tunneled network indicates how big the packets produced for the tunneling connection can be. The endpoint sets this size to be no more than the maximum size available for the encrypted tunneled packet in the above MTU case.

For example, a typical Ethernet MTU is 1500 bytes, and IPv4 header is typically 20 bytes and IPv6 is typically 40 bytes. A UDP header is a fixed 8 bytes, while a TCP header is typically 20 or more bytes, depending on conditions. A tunnel header is a maximum of 32 bytes. Therefore, in a scenario including VPN, UDP, IPv6, and Ethernet, a potential size available for encrypted packets is 1420 bytes, such that the endpoint sets the tunnel MTU to 1420 bytes to ensure that each produced bearer packet fits in the bearer MTU of 1500 bytes.

When the tunneling connection uses TCP, TCP knows how much room is actually available for the data layered on TCP which is normally advertised during a TCP establishment and measured during a long connection. This value which indicates the available bytes for data transmission is called maximum segment size (MSS) in which TCP packets are referred to as segments. Considering certain parameters in connection can be variable in an unbuffered TCP connection, the endpoint may dynamically adjust/optimize the tunnel MTU from the TCP MSS, so that each packet produced by the tunnel can fit in a single TCP segment on the current TCP connection to keep a 1 on 1 relationship between produced tunnel packets and transmitted bearer packets. For example, a "Path MTU" which refers to MTU of the entire path between the two ends of the TCP connection may be variable.

At step 204, the endpoint transmits data between the endpoint and the server over the tunneling connection by using the selected at least one protocol.

The steps 202 to 204 may be performed by a same operator. In some cases, the operator may be an administrator, a user, a host node, and any suitable network-connected device which is configured to perform steps 202 to 204. For example, the steps 202 to 204 may be performed by a same endpoint (e.g., endpoint 130 shown in FIG. 1). In some cases, the steps 202 to 204 may be performed separately, by different operators. For example, the steps of selecting a protocol to be used to establish a tunneling connection may be performed/initiated by an endpoint or a server. More specifically, the steps 202 to 204 may be performed in different environments. For example, the determination of selecting a protocol may be accomplished in a third-party environment, e.g., a third-party endpoint or server.

With reference to the description of FIGS. 1 through 2, the protocol selection for establishing a tunneling connection, as described herein, can provide the following technical effects. The described protocol selection techniques can provide a stable and secure connection for data transmission, more specifically a secured UDP connection over restrictive networks. With determinations associated with UDP, the tunneling connection may be established over restrictive networks. Furthermore, the connection may avoid a loss of packets in transmission because of a determination of MTU size, even the connection is established using UDP.

Figure 3:
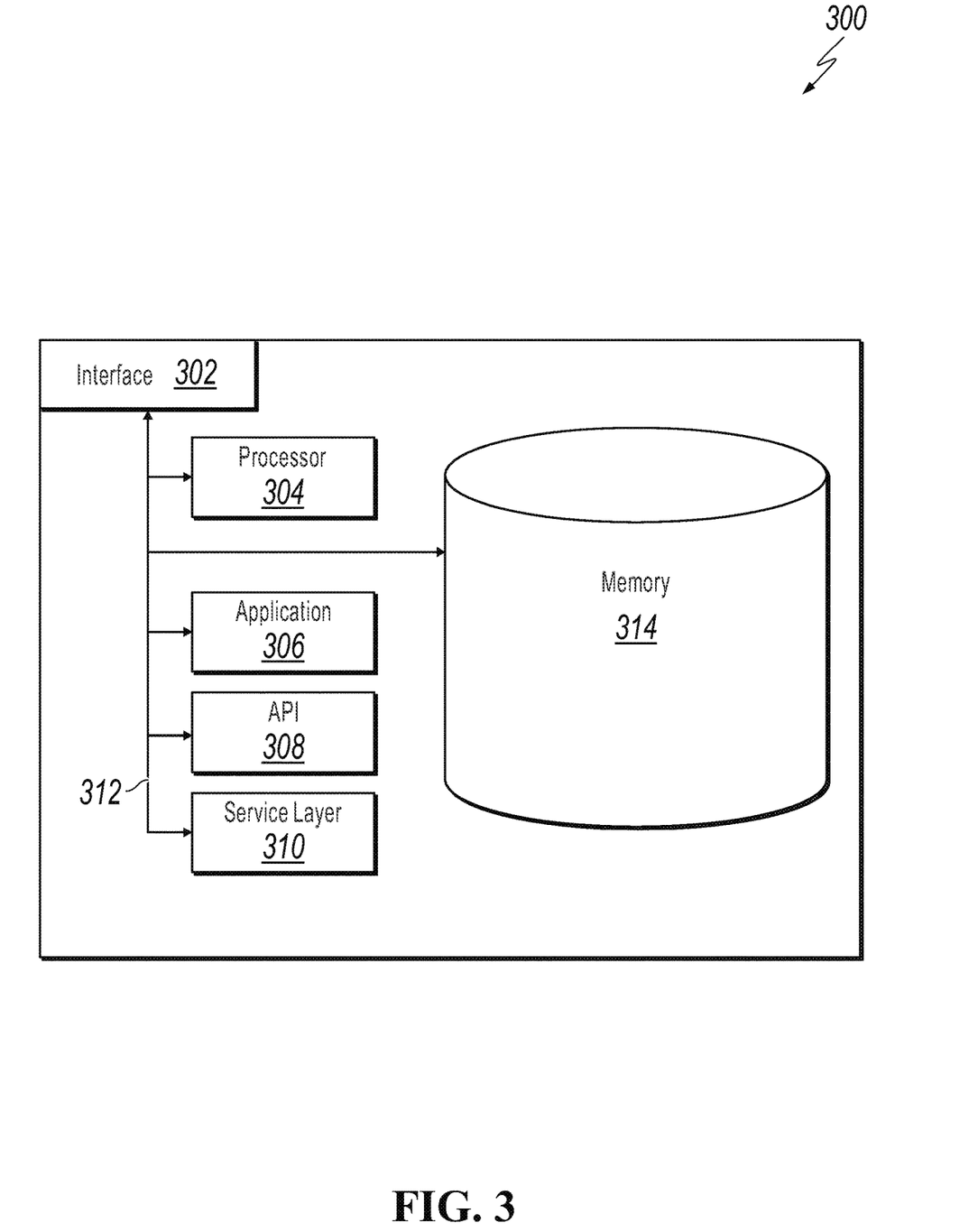
FIG. 3 illustrates a high level architecture block diagram of a server, according to an implementation.

FIG. 3 illustrates a high level architecture block diagram of a server 300 according to an implementation. The server 300 can be implemented as the server described in FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The server 300 includes a computing system configured to select a protocol and establish a tunneling connection using the selected protocol properly. In some cases, the server 300 may include a computing system implementing processes and methods disclosed in FIG. 1. In some cases, the processing algorithm of the protocol selection can be implemented in an executable computing code, e.g., C/C++ executable codes. In some cases, the server 300 can include a standalone LINUX system that runs batch applications. In some cases, the server 300 can include mobile or personal computers.

The server 300 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The server 300 can serve as a client, network component, a server, a database or other persistency, and/or any other components. In some implementations, one or more components of the server 300 may be configured to operate within a cloud-computing-based environment.

At a high level, the server 300 is an electronic computing device operable to receive, transmit, process, store, or manage data. According to some implementations, the server 300 can also include or be communicably coupled with an application server, e-mail server, web server, caching server, streaming data server, business intelligence (BI) server, and/or other servers.

The server 300 can process the selection of a protocol to establish a tunneling connection over the network from a client application. In addition, data/packet can be processed by the server 300 from internal users (e.g., from a command console or by another appropriate access method), external or third parties, other automated applications, as well as any other appropriate entities, individuals, systems, or computers.

Each of the components of the server 300 can communicate using a system bus 312. In some implementations, any and/or all the components of the server 300, both hardware and/or software, may interface with each other and/or the interface 302 over the system bus 312 using an application programming interface (API) 308 and/or a service layer 310. The API 308 may include specifications for routines, data structures, and object classes. The API 308 may be either computer language-independent or -dependent and refer to a complete interface, a single function, or even a set of APIs. The service layer 310 provides software services to the server 300. The functionality of the server 300 may be accessible for all service consumers using this service layer. Software services, such as those provided by the service layer 310, provide reusable, defined business functionalities through a defined interface. For example, the interface may be software written in JAVA, C++, or other suitable languages providing data in Extensible Markup Language (XML) format or other suitable format. While illustrated as an integrated component of the servers 300, alternative implementations may illustrate the API 308 and/or the service layer 310 as stand-alone components in relation to other components of the server 300. Moreover, any or all parts of the API 308 and/or the service layer 310 may be implemented as child or sub-modules of another software module, enterprise application, or hardware module without departing from the scope of this disclosure.

The server 300 includes an interface 302. Although illustrated as a single interface 302 in FIG. 3, two or more interfaces 302 may be used according to particular needs, desires, or particular implementations of the server 300. The interface 302 is used by the server 300 for communicating with other systems in a distributed environment connected to a network (whether illustrated or not). Generally, the interface 302 comprises logic encoded in software and/or hardware in a suitable combination and operable to communicate with the network. More specifically, the interface 302 may comprise software supporting one or more communication protocols associated with communications such that the network or interface's hardware is operable to communicate physical signals within and outside of the server 300.

The server 300 includes at least one processor 304. Although illustrated as a single processor 304 in FIG. 3, two or more processors may be used according to particular needs, desires, or particular implementations of the server. Generally, the processor 304 executes instructions and manipulates data to perform the operations of the server 300. Specifically, the processor 304 executes the functionality required for selecting protocol to be used to establish a tunneling connection disclosed in FIGS. 1 to 2.

The server 300 also includes a memory 314 that holds data for the server 300. Although illustrated as a single memory 314 in FIG. 3, two or more memories may be used according to particular needs, desires, or particular implementations of the server 300. While memory 314 is illustrated as an integral component of the server 300, in alternative implementations, memory 314 can be external to the server 300.

The application 306 is an algorithmic software engine providing functionality according to particular needs, desires, or particular implementations of the server 300, particularly with respect to the functionality required for anomaly detection. Although illustrated as a single application 306, the application 306 may be implemented as multiple applications 306 on the server 300. In addition, although illustrated as integral to the server 300, in alternative implementations, the application 306 can be external to the server 300.

There may be any number of the server 300 associated with, or external to, and communicating over a network. Further, this disclosure contemplates that many users may use one server 300, or that one user may use multiple servers 300.

Figure 4:
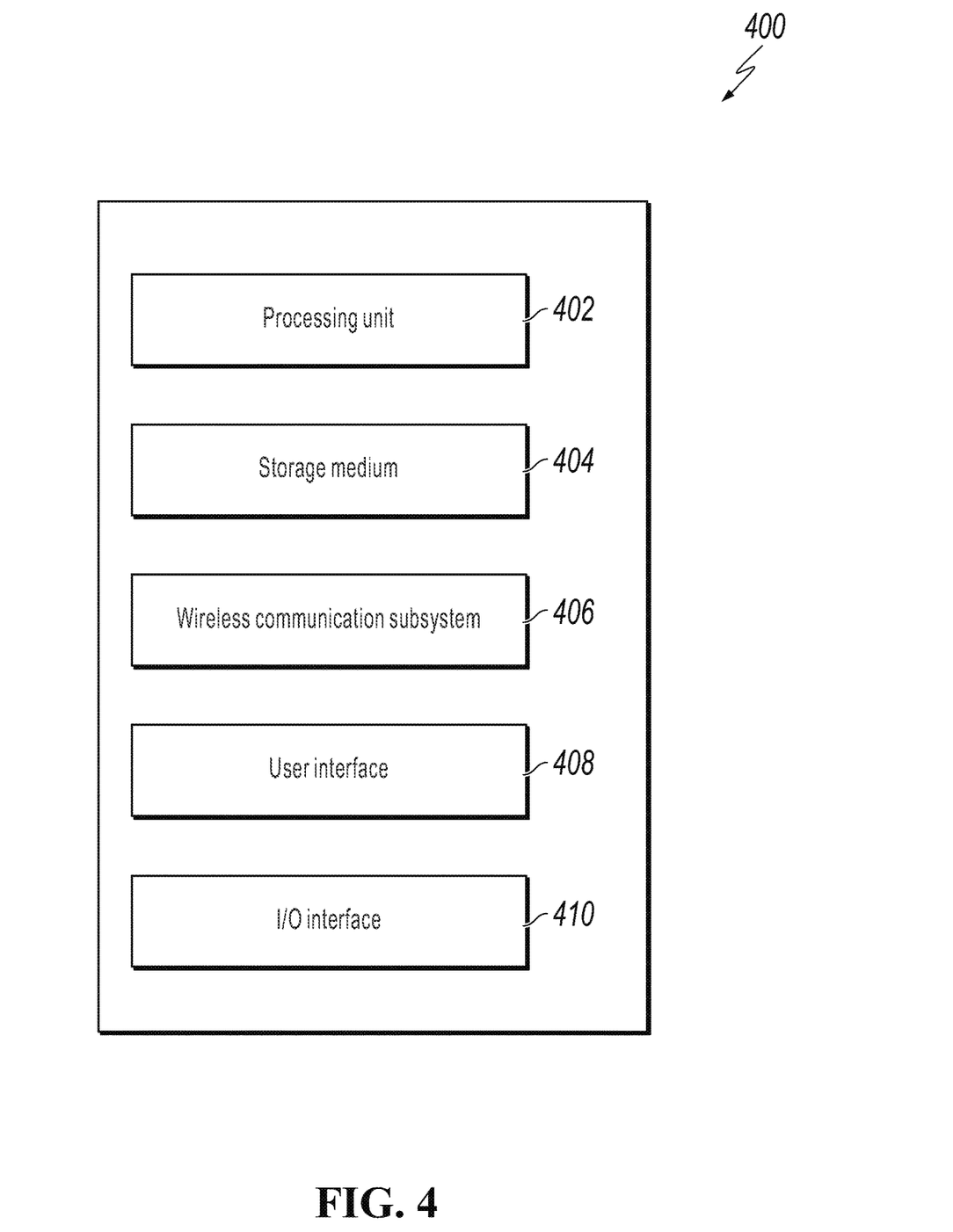
FIG. 4 is a block diagram illustrating an example user device, according to an implementation.

FIG. 4 is a block diagram illustrating an example user device 400 according to an implementation. The example user device 400 can be implemented as the endpoint 130 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The illustrated device 400 includes a processing unit 402, a computer-readable storage medium 404 (for example, read-only memory (ROM) or flash memory), a wireless communication subsystem 406, a user interface 408, and an I/O interface 410.

The processing unit 402 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 402 may be configured to generate control information, such as a measurement report, or to respond to received information, such as control information from a network node. The processing unit 402 may also be configured to make a Radio Resource Management (RRM) decision such as cell selection/reselection information, or trigger a measurement report. The processing unit 402 can also include other auxiliary components, such as random access memory (RAM) and ROM.

The computer-readable storage medium 404 can store an operating system (OS) of the endpoint 130 and various other computer-executable instructions, logic or software programs for performing one or more of the processes, steps, or actions described above. In some cases, the computer-readable storage medium 404 can be transitory, non-transitory, or a combination thereof.

The wireless communication subsystem 406 may be configured to provide wireless communication for voice, data, and/or control information provided by the processing unit 402. The wireless communication subsystem 406 can include, for example, one or more antennas, a receiver, a transmitter, a local oscillator, a mixer, and a DSP unit. In some implementations, the wireless communication subsystem 406 can support MIMO transmissions. In some implementations, the receiver in the wireless communication subsystems 406 can be an advanced receiver or a baseline receiver. Two receivers can be implemented with identical, similar, or different receiver processing algorithms.

The user interface 408 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 410 can include, for example, a universal serial bus (USB) interface.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

Described implementations of the subject matter can include one or more features, alone or in combination.

For example, in a first implementation, a method, comprising: selecting, at an endpoint, at least one protocol to be used to establish a tunneling connection between the endpoint and an server, wherein the at least one protocol is one of transmission control protocol (TCP) or user datagram protocol (UDP); and transmitting data between the endpoint and the server over the tunneling connection by using the selected at least one protocol.

The foregoing and other described implementations can each, optionally, include one or more of the following features:

A first feature, combinable with any of the following features, wherein selecting the at least one protocol to be used to establish the tunneling connection between the endpoint and the server comprises: sending at least one request to the server via UDP; and selecting TCP to be used in the tunneling connection in response to a failure of receiving a response corresponding to the at least one request.

A second feature, combinable with any of the foregoing and following features, wherein sending the at least one request comprises: sending a first request to the server, wherein the first request is to establish the tunneling connection; in response to the first request, receiving a first response to establish the tunneling connection; sending a second request to the server via UDP; and selecting TCP to be used in the tunneling connection in response to a failure of receiving a second response corresponding to the second request.

A third feature, combinable with any of the foregoing and following features, wherein the first request comprises at least one authentication credential.

A fourth feature, combinable with any of the foregoing and following features, wherein selecting the at least one protocol to be used to establish the tunneling connection between the endpoint and the server comprises: using TCP and UDP in the tunneling connection; determining that a packet is transmitted to the server successfully by using UDP; and selecting UDP to be used in the tunneling connection.

A fifth feature, combinable with any of the foregoing and following features, selecting the at least one protocol to be used to establish the tunneling connection between the endpoint and the server comprises: determining that at least one parameter of the tunneling connection associates with UDP; and selecting UDP to be used in the tunneling connection.

A sixth feature, combinable with any of the foregoing and following features, further comprising: determining a maximum transmission unit (MTU) size based on the selected at least one protocol; and generating internet protocol (IP) packet based on the MTU size.

In a second implementation, a computer-readable medium containing instructions which, when executed, cause a computing device to perform operations comprising: selecting, at an endpoint, at least one protocol to be used to establish a tunneling connection between the endpoint and a server, wherein the at least one protocol is one of transmission control protocol (TCP) or user datagram protocol (UDP); and transmitting data between the endpoint and the server over the tunneling connection by using the selected at least one protocol.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: selecting, at an endpoint, at least one protocol to be used to establish a tunneling connection between the endpoint and a server, wherein the at least one protocol is one of transmission control protocol (TCP) or user datagram protocol (UDP); and transmitting data between the endpoint and the server over the tunneling connection by using the selected at least one protocol.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM, RAM, or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or package into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   selecting, at an endpoint, at least one protocol from transmission control protocol (TCP) or user datagram protocol (UDP) to be used to establish a tunneling connection between the endpoint and a server, wherein selecting the at least one protocol comprises:
      retrieving at least one local network identifier associated with a previous tunneling connection;
      determining, based on the at least one local network identifier associated with the previous tunneling connection, whether the previous tunneling connection has been successfully established using UDP; and
      selecting one protocol based on whether the previous tunneling connection has been successfully established using UDP; and
   transmitting data between the endpoint and the server over the tunneling connection by using the selected one protocol.

2. The computer-implemented method of claim 1, wherein selecting the at least one protocol to be used to establish the tunneling connection between the endpoint and the server comprises:
   sending at least one request to the server via UDP; and
   selecting TCP to be used in the tunneling connection in response to a failure of receiving a response corresponding to the at least one request.

3. The computer-implemented method of claim 2, wherein sending the at least one request comprises:
   sending a first request to the server, wherein the first request is to establish the tunneling connection;
   in response to the first request, receiving a first response to establish the tunneling connection;
   sending a second request to the server via UDP; and
   selecting TCP to be used in the tunneling connection in response to a failure of receiving a second response corresponding to the second request.

4. The computer-implemented method of claim 3, wherein the first request comprises at least one authentication credential.

5. The computer-implemented method of claim 1, wherein selecting the at least one protocol to be used to establish the tunneling connection between the endpoint and the server comprises:
   using TCP and UDP in the tunneling connection;
   determining that a packet is transmitted to the server successfully by using UDP; and
   selecting UDP to be used in the tunneling connection.

6. The computer-implemented method of claim 1, wherein selecting the at least one protocol to be used to establish the tunneling connection between the endpoint and the server comprises:
   determining that the at least one local network identifier associated with the previous tunneling connection associates with UDP; and
   selecting UDP to be used in the tunneling connection.

7. The computer-implemented method of claim 1, further comprising:
   determining a maximum transmission unit (MTU) size based on the selected at least one protocol; and
   generating an internet protocol (IP) packet based on the MTU size.

8. A non-transitory, computer-readable medium containing instructions which, when executed, cause a computing device to perform operations comprising:
   selecting, at an endpoint, at least one protocol from transmission control protocol (TCP) or user datagram protocol (UDP) to be used to establish a tunneling connection between the endpoint and a server, wherein selecting the at least one protocol comprises:
      retrieving at least one local network identifier associated with a previous tunneling connection;
      determining, based on the at least one local network identifier associated with the previous tunneling connection, whether the previous tunneling connection has been successfully established using UDP; and
      selecting one protocol based on whether the previous tunneling connection has been successfully established using UDP; and
   transmitting data between the endpoint and the server over the tunneling connection by using the selected one protocol.

9. The non-transitory, computer-readable medium of claim 8, wherein selecting the at least one protocol to be used to establish the tunneling connection between the endpoint and the server comprises:
sending at least one request to the server via UDP; and
selecting TCP to be used in the tunneling connection in response to a failure of receiving a response corresponding to the at least one request.

10. The non-transitory, computer-readable medium of claim 9, wherein sending the at least one request comprises:
sending a first request to the server, wherein the first request is to establish the tunneling connection;
in response to the first request, receiving a first response to establish the tunneling connection;
sending a second request to the server via UDP; and
selecting TCP to be used in the tunneling connection in response to a failure of receiving a second response corresponding to the second request.

11. The non-transitory, computer-readable medium of claim 10, wherein the first request comprises at least one authentication credential.

12. The non-transitory, computer-readable medium of claim 8, wherein selecting the at least one protocol to be used to establish the tunneling connection between the endpoint and the server comprises:
using TCP and UDP in the tunneling connection;
determining that a packet is transmitted to the server successfully by using UDP; and
selecting UDP to be used in the tunneling connection.

13. The non-transitory, computer-readable medium of claim 8, wherein selecting the at least one protocol to be used to establish the tunneling connection between the endpoint and the server comprises:
determining that the at least one local network identifier associated with the previous tunneling connection associates with UDP; and
selecting UDP to be used in the tunneling connection.

14. The non-transitory, computer-readable medium of claim 8, wherein the operations further comprise:
determining a maximum transmission unit (MTU) size based on the selected at least one protocol; and
generating an internet protocol (IP) packet based on the MTU size.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
selecting, at an endpoint, at least one protocol from transmission control protocol (TCP) or user datagram protocol (UDP) to be used to establish a tunneling connection between the endpoint and a server, wherein selecting the at least one protocol comprises:
retrieving at least one local network identifier associated with a previous tunneling connection;
determining, based on the at least one local network identifier associated with the previous tunneling connection, whether the previous tunneling connection has been successfully established using UDP; and
selecting one protocol based on whether the previous tunneling connection has been successfully established using UDP; and
transmitting data between the endpoint and the server over the tunneling connection by using the selected one protocol.

16. The computer-implemented system of claim 15, wherein selecting the at least one protocol to be used to establish the tunneling connection between the endpoint and the server comprises:
sending at least one request to the server via UDP; and
selecting TCP to be used in the tunneling connection in response to a failure of receiving a response corresponding to the at least one request.

17. The computer-implemented system of claim 16, wherein sending the at least one request comprises:
sending a first request to the server, wherein the first request is to establish the tunneling connection;
in response to the first request, receiving a first response to establish the tunneling connection;
sending a second request to the server via UDP; and
selecting TCP to be used in the tunneling connection in response to a failure of receiving a second response corresponding to the second request.

18. The computer-implemented system of claim 15, wherein selecting the at least one protocol to be used to establish the tunneling connection between the endpoint and the server comprises:
using TCP and UDP in the tunneling connection;
determining that a packet is transmitted to the server successfully by using UDP; and
selecting UDP to be used in the tunneling connection.

19. The computer-implemented system of claim 15, wherein selecting the at least one protocol to be used to establish the tunneling connection between the endpoint and the server comprises:
determining that the at least one local network identifier associated with the previous tunneling connection associates with UDP; and
selecting UDP to be used in the tunneling connection.

20. The computer-implemented system of claim 15, wherein the operations further comprise:
determining a maximum transmission unit (MTU) size based on the selected at least one protocol; and
generating an internet protocol (IP) packet based on the MTU size.

* * * * *